US012603543B2

(12) United States Patent
Ruppert et al.

(10) Patent No.: US 12,603,543 B2
(45) Date of Patent: Apr. 14, 2026

(54) WIRING RING, STATOR AND ELECTRIC MACHINE

(71) Applicant: Schaeffler Technologies AG & Co. KG, Herzogenaurach (DE)

(72) Inventors: Andreas Ruppert, Buhlertal (DE); Attila Hajba, Kisunyom (HU)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 236 days.

(21) Appl. No.: 18/277,812

(22) PCT Filed: Feb. 3, 2022

(86) PCT No.: PCT/DE2022/100097
§ 371 (c)(1),
(2) Date: Aug. 18, 2023

(87) PCT Pub. No.: WO2022/179658
PCT Pub. Date: Sep. 1, 2022

(65) Prior Publication Data
US 2024/0128826 A1 Apr. 18, 2024

(30) Foreign Application Priority Data
Feb. 25, 2021 (DE) .......................... 102021104536.3

(51) Int. Cl.
*H02K 3/50* (2006.01)
*H02K 3/52* (2006.01)
*H02K 5/22* (2006.01)
(52) U.S. Cl.
CPC ............... *H02K 5/225* (2013.01); *H02K 3/50* (2013.01); *H02K 3/52* (2013.01); *H02K 3/522* (2013.01); *H02K 2203/09* (2013.01)

(58) Field of Classification Search
CPC ........... H02K 5/225; H02K 3/52; H02K 3/50; H02K 3/522; H02K 2203/09; H02K 3/38
(Continued)

(56) References Cited

U.S. PATENT DOCUMENTS

2013/0049501 A1* 2/2013 Fujisaki ................. H02K 3/522
                                                           310/71
2019/0006905 A1* 1/2019 Lindwurm ............. H02K 3/522
(Continued)

FOREIGN PATENT DOCUMENTS

CN        210607669 U    5/2020
CN        111277067 A    6/2020
(Continued)

*Primary Examiner* — Alexander A Singh
(74) *Attorney, Agent, or Firm* — Volpe Koenig

(57) ABSTRACT

A wiring ring for a stator of an electric machine, including a housing having a plurality of slot-like recesses and a plurality of in particular annular or annular segment-like busbars which are arranged in the slot-like recesses. The busbars are designed to establish an electrical contact between the winding wire ends of the stator windings and the contact connections of a power electronics unit for controlling the electric machine. At least one of the bus bars contact to the contact connections of the power electronics unit is implemented via a busbar connection region by means of a screw connection. According to the disclosure, the screw connection has a nut which can be arranged loosely in a receptacle space of a receptacle underneath a through-hole in the busbar connection region.

17 Claims, 5 Drawing Sheets

(58) Field of Classification Search
USPC .......................................................... 310/71
See application file for complete search history.

(56) References Cited

U.S. PATENT DOCUMENTS

| | | | |
|---|---|---|---|
| 2019/0372422 | A1 | 12/2019 | Robertson |
| 2020/0244131 | A1 | 7/2020 | Hulsey et al. |

FOREIGN PATENT DOCUMENTS

| | | | |
|---|---|---|---|
| DE | 112014000954 | T5 | 11/2015 |
| DE | 102018119831 | A1 | 2/2020 |
| EP | 2562915 | A2 | 2/2013 |
| EP | 2592722 | B1 | 12/2018 |
| KR | 1020200034201 | A | 3/2020 |
| WO | 03023905 | A2 | 3/2003 |

* cited by examiner

WIRING RING, STATOR AND ELECTRIC MACHINE

CROSS-REFERENCE TO RELATED APPLICATIONS

This application is the U.S. National Phase of PCT Appln. No. PCT/DE2022/100097, filed Feb. 3, 2022, which claims the benefit of German Patent Appln. No. 102021104536.3, filed Feb. 25, 2021, the entire disclosures of which are incorporated by reference herein.

TECHNICAL FIELD

The present disclosure relates to an interconnection ring for the stator of an electric machine.

BACKGROUND

Permanently excited synchronous machines (PSM) are, in particular, used in many industrial applications and increasingly also in the automotive industry. Such an electric machine comprises a stator to be energized and a permanently excited rotor. The stator is mostly formed by a stator body with wire windings, a stator carrier, an interconnection ring and a terminal for connection to a power electronics unit (PE).

Electric machines with concentrated windings have a differing number of so-called stator teeth. In many cases, three consecutive teeth form a pole pair. For electric machines with concentrated windings and a star connection, the individual pole pairs, so for example three teeth, must be coupled or electrically connected to one another. The implementation and accessibility of this star point is often limited by the available installation space.

The variance and integration of a large number of different subsystems means that more and more components have to be integrated into a small installation space. The electric machine often has a three-phase design. The interface to the power electronics unit is implemented via the high-voltage contact, also referred to as the HV terminal. Generally, the power electronics unit is connected to the electric machine via three rigid busbars, wherein the mechanical and electrical connection is usually made via a screw connection or similar.

From DE 10 2018 119 831 A1, an electric machine comprising a stator with concentrated windings arranged on stator teeth and comprising at least one temperature sensor for detecting the temperature of a winding is already known. Here, a stator component is designed as an interconnection ring, which carries one or more metal wiring conductor rings, for example.

Furthermore, a contacting device for electrically connecting the wiring wire ends of the stator windings to contact connections of a power electronics unit is known from US 2019/0372422 A1, in which the corresponding conductor ends to be connected are electrically connected to one another by means of a press connection.

SUMMARY

An object of the disclosure is to provide an interconnection ring for the stator of an electric machine which is further improved with regard to the mechanical-electrical connection of the stator winding wire ends to the terminals of an electric power electronics unit. In particular, the mechanical connection of the electrical contacting is to be improved, even if there may be greater tolerance variations in the mechanical connection components.

This object is achieved by an interconnection ring for the stator of an electric machine with the features of patent claim 1 as well as by a stator with the features of patent claim 9 and an electric machine with the features of patent claim 10.

An interconnection ring according to the disclosure for the stator of an electric machine comprises a housing having a plurality of groove-like recesses and a plurality of busbars which are designed in particular in the shape of a circular ring or circular ring segment and are arranged in the groove-like recesses, wherein the busbars are designed to establish an electrical contact between the winding wire ends of the stator windings and the contact connections of a power electronics unit for controlling the electric machine, and wherein, in at least one of the busbars, the contact to the contact connections of the power electronics unit is implemented via a busbar connection region by means of a screw connection. According to the disclosure, the screw connection has a screw nut which can be arranged loosely in a receiving space of a receptacle underneath a through-opening of the busbar connection region. This provides the advantage of giving the mechanical-electrical connection point a certain elasticity, so that the tolerance chain of the high-voltage interface is more manageable and a connection between the power electronics unit and the busbars of the interconnection ring is designed to be more assembly-friendly.

First, the individual elements of the claimed subject matter of the disclosure are explained in the order of their relevance or their mention in the claims, and then particularly preferred embodiments of the subject matter of the disclosure are described.

Electric machines are used to convert electrical energy into mechanical energy and/or vice versa, and generally comprise a stationary part referred to as a stator or armature, and a part referred to as a rotor and arranged movably relative to the stationary part.

In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

A rotor is the rotating (spinning) part of an electric machine. In particular, a rotor is used when there is also a stator.

The stator of a radial flux machine usually has a cylindrical structure and generally consists of electrical laminations that are electrically insulated from one another and are structured in layers and packaged to form laminated cores. With this structure, the eddy currents in the stator caused by the stator field are kept low. Distributed over the circumference, grooves or peripherally closed recesses are embedded into the electrical lamination running parallel to the rotor shaft, and accommodate the stator winding or parts of the stator winding. Depending on the construction towards the surface, the grooves can be closed with closing elements, such as closing wedges or covers or the like, to prevent the stator winding from detaching.

A stator winding is an electrically conductive conductor whose length extension is much greater than its diameter. The stator winding can generally have any cross-sectional shape. Rectangular cross-sectional shapes are preferred, as these allow for high packing densities and consequently high power densities to be achieved. Particularly preferably, a stator winding is formed of copper. Preferably, a stator winding has an insulation. To insulate the stator winding, for example, mica paper, which for mechanical reasons can be reinforced by a glass fabric bearer, may be wound in tape form around one or more stator windings, which are impregnated by means of a curing resin. In principle, it is also possible to use a curable varnish layer without a mica paper to insulate a stator winding.

In an electric machine with concentrated windings, the interconnection of the individual windings distributed around the circumference can, for example, be achieved by means of an interconnection ring or several interconnection rings. Here, busbars usually made of copper can be arranged on or in a common carrier ring or separate carrier rings made of plastic. On occasion, this type of interconnection ring has also been referred to as a "switching ring" or "contact bridge".

Interconnection rings of this type are usually placed axially on the winding package.

Further advantageous embodiments of the disclosure are specified in the dependent claims. The features listed individually in the dependent claims can be combined with one another in a technologically meaningful manner and can define further embodiments of the disclosure. In addition, the features indicated in the claims are specified and explained in more detail in the description, wherein further preferred embodiments of the disclosure are shown.

According to an advantageous embodiment of the disclosure, the receptacle can be formed of insulating material, in particular of a plastic or plastic composite material, thereby enabling a particularly simple and inexpensive manufacture.

According to a further preferred further development of the disclosure, the receiving space of the receptacle can be designed to be pot-shaped and formed with a closed bottom, such that a screw element screwed into the screw nut is electrically insulated on the bottom side in the receiving space of the receptacle. This results in a simplified construction and improved, with regard to insulation, reception of the fastening elements (screw/nut).

Furthermore, according to an equally advantageous embodiment of the disclosure, the receptacle can circumferentially have in its receiving space the geometric contour of the screw nut, so that the screw nut inserted into the receiving space is secured against rotation within the receiving space. This advantageous construction eliminates the need for additional separate anti-rotation elements, which in turn simplifies the assembly and reduces costs.

Advantageously, the receptacle is designed as a separate component which can be fastened to the busbar in a force-fitting and/or form-fitting manner. This provides a solution that is easy to assemble and designed to be easily replaceable in the event of damage.

Furthermore, the disclosure can also be further developed in that the receptacle has a fastening arm with latching means, by means of which the receptacle can be fastened to the busbar in a captive and in particular detachable manner. This provides a solution of simple construction and ensures that the receptacle is securely fixed in position. Alternatively, the receptacle can also be designed as a separate component which can be fastened to the housing of the interconnection ring in a force-fitting and/or form-fitting manner.

Particularly preferably, the receptacle has at least two, preferably exactly three, adjacently arranged receiving spaces for receiving one screw nut in each case, wherein each receiving space is assigned to a busbar of a different phase (u, v, w). The advantage that can be realized here is that several receptacles can be provided at the same time as part of a simple and cost-effective manufacturing process.

Furthermore, the object underlying the disclosure is achieved by a stator with an interconnection ring according to the disclosure, as described above, and by an electric machine having such a stator with an interconnection ring constructed according to the disclosure.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the subject matter outlined in the figures and to combine them with other components and knowledge from the present description and/or figures. In particular, it should be noted that the figures and in particular the size relationships shown are only schematic in nature. Identical reference symbols indicate the same objects, so that, where applicable, explanations from other figures can also be used. In the figures.

DETAILED DESCRIPTION

Figure 1:
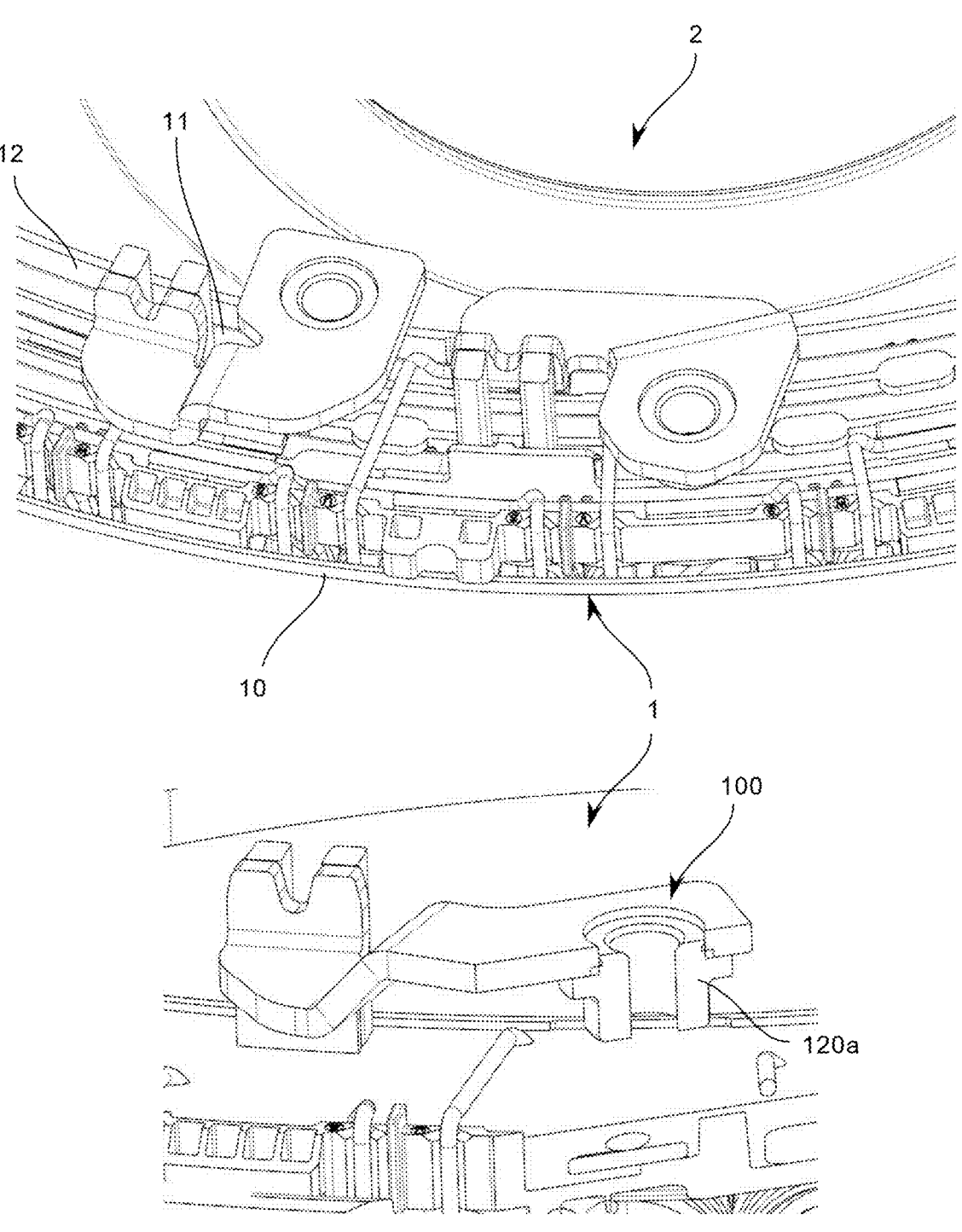
FIG. 1 shows an interconnection ring according to the prior art in a perspective view in two different views.

FIG. 1 shows an interconnection ring 1 according to the prior art in a perspective view in two different views. In the top illustration, an interconnection ring 1 is shown in a partial section, wherein the interconnection ring 1 is shown to have busbars 12 for three phases (u, v, w) and a star point. In the shown busbar connection region 100 of each busbar 12, a screw nut 120a in the form of a threaded bushing is firmly connected to the busbar from below in each case (e.g. welded or pressed or the like). In the bottom illustration, this connection is shown once again in an enlarged view in a sectional view.

Figure 2:
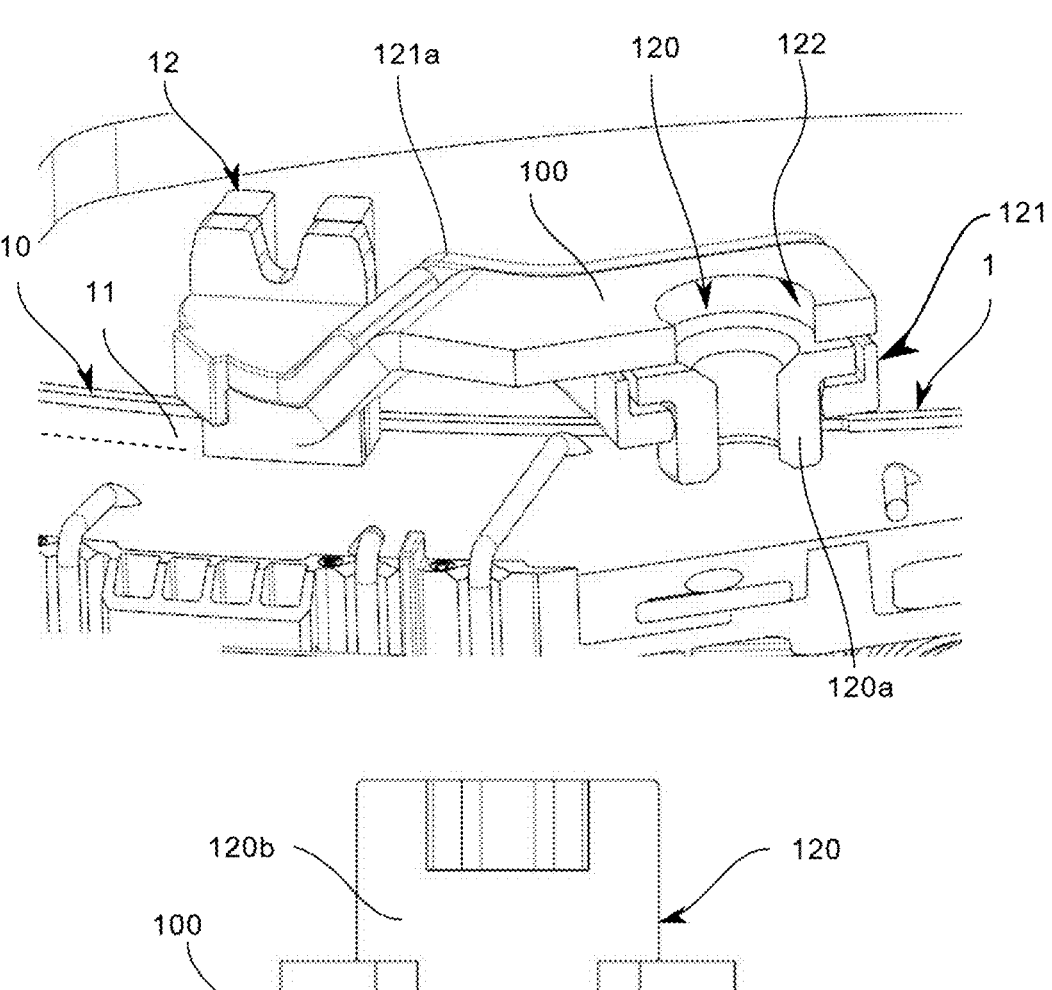
FIG. 2 shows an interconnection ring according to a first embodiment of the disclosure in a perspective view, at the top, and in an enlarged detail view in a sectional view (at the bottom)

FIG. 2 shows a section of an interconnection ring 1 according to a first embodiment of the disclosure in a perspective view, at the top, and in an enlarged detail view in a sectional view, at the bottom. In this regard, the interconnection ring 1 shown comprises a housing 10 having a plurality of groove-like recesses 11 and a plurality of busbars 12 which are designed in the shape of a circular ring or circular ring segment and are arranged in the groove-like recesses 11. The busbars 12 are designed to establish an electrical contact between the wiring wire ends of the stator windings and the contact connections of a power electronics unit for controlling the electric machine. In this regard, the contact to the contact connections of the power electronics unit not shown is implemented via a busbar connection region 100 with a screw connection 120. For this purpose, the screw connection 120 has a screw nut 120$a$ which is arranged loosely in a receiving space 110 of a receptacle 121 underneath a through-opening 122 of the busbar connection region 100. Here, the receptacle 121 is formed of insulating material, in particular of a plastic or plastic composite material. It is also readily apparent from the figure that the receiving space 110 of the receptacle 121 is designed to be pot-shaped, wherein the bottom has a circular opening for guiding a cylindrical extension of a screw nut 120$a$. In the illustrated embodiment, the receptacle 121 has a first receptacle portion with which the receptacle 121 rests on top of the busbar connection region 100, a second receptacle portion via which the receptacle 121 rests against the busbar connection region 100 from below, and a central portion formed as a fastening arm 121$a$.

Figure 3:
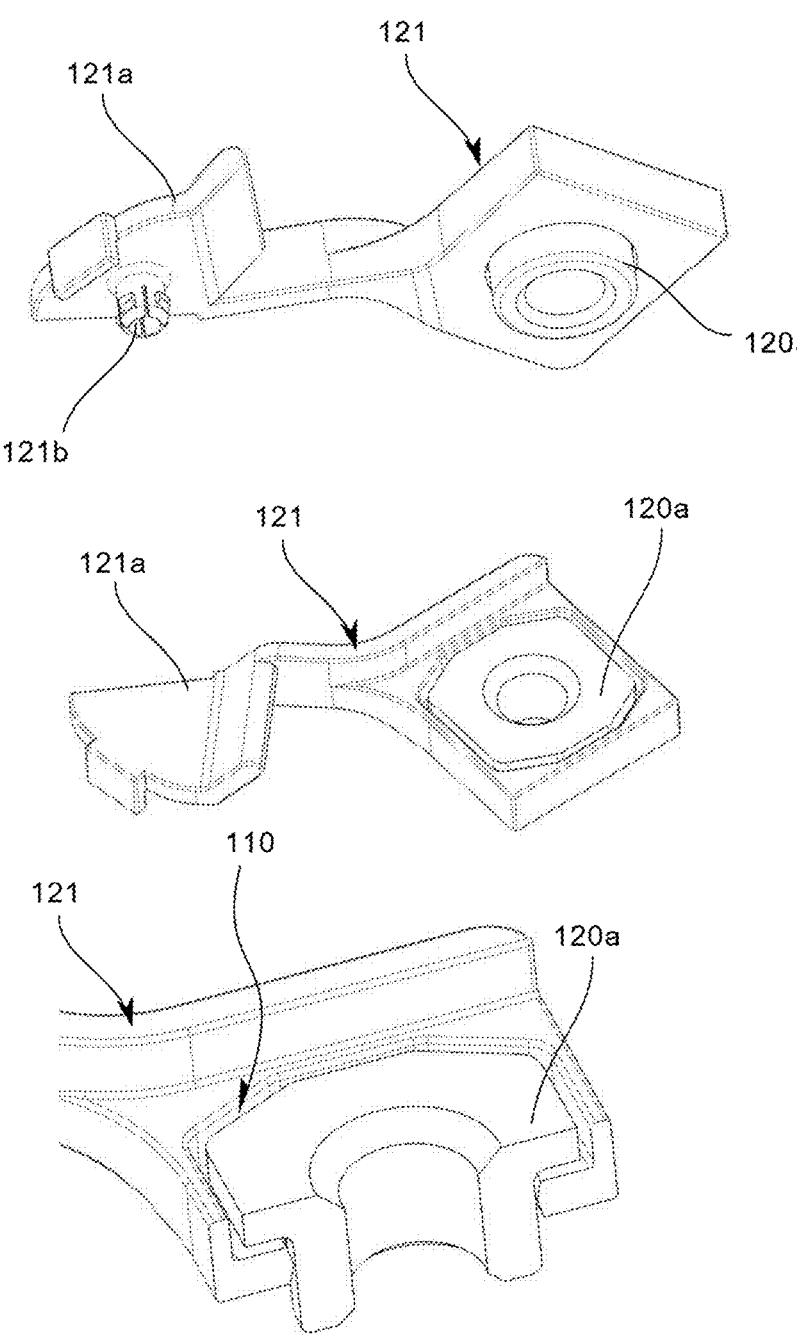
FIG. 3 shows the receptacle according to FIG. 2 in three different views.

FIG. 3 shows the receptacle 121 according to FIG. 2 in three different views. In the top and middle views, the receptacle 121 is shown in a different perspective view in each case, while in the bottom view, an enlarged sectional view is shown in the region of the receiving space 110. It can clearly be seen that the receptacle 121 forms the receiving space 110 on its one end for receiving the screw nut 120$a$ in a manner secured against rotation and has latching means 121$b$ formed on its other end on its underside for connection to the busbar connection region 100.

In its receiving space 110, the receptacle 121 circumferentially traces the geometric contour of the screw nut 120$a$, so that the screw nut 120$a$ inserted into the receiving space 110 is secured against rotation within the receiving space 110. The figure further shows that the receptacle 121 is designed as a separate component which can be fastened to the busbar 12 in a force and form-fitting manner and/or form-fitting manner via the latching connection and other geometry sections. The figure further shows that the receptacle 121 has a fastening arm 121$a$ with latching means 121$b$, by means of which the receptacle 121 can be fastened to the busbar 12 in a captive and in particular detachable manner.

FIG. 3 also clearly shows that the receptacle 121 is designed as a separate component which can be fastened to the housing 10 of the interconnection ring 1 in a force-fitting and/or form-fitting manner.

Figure 4:
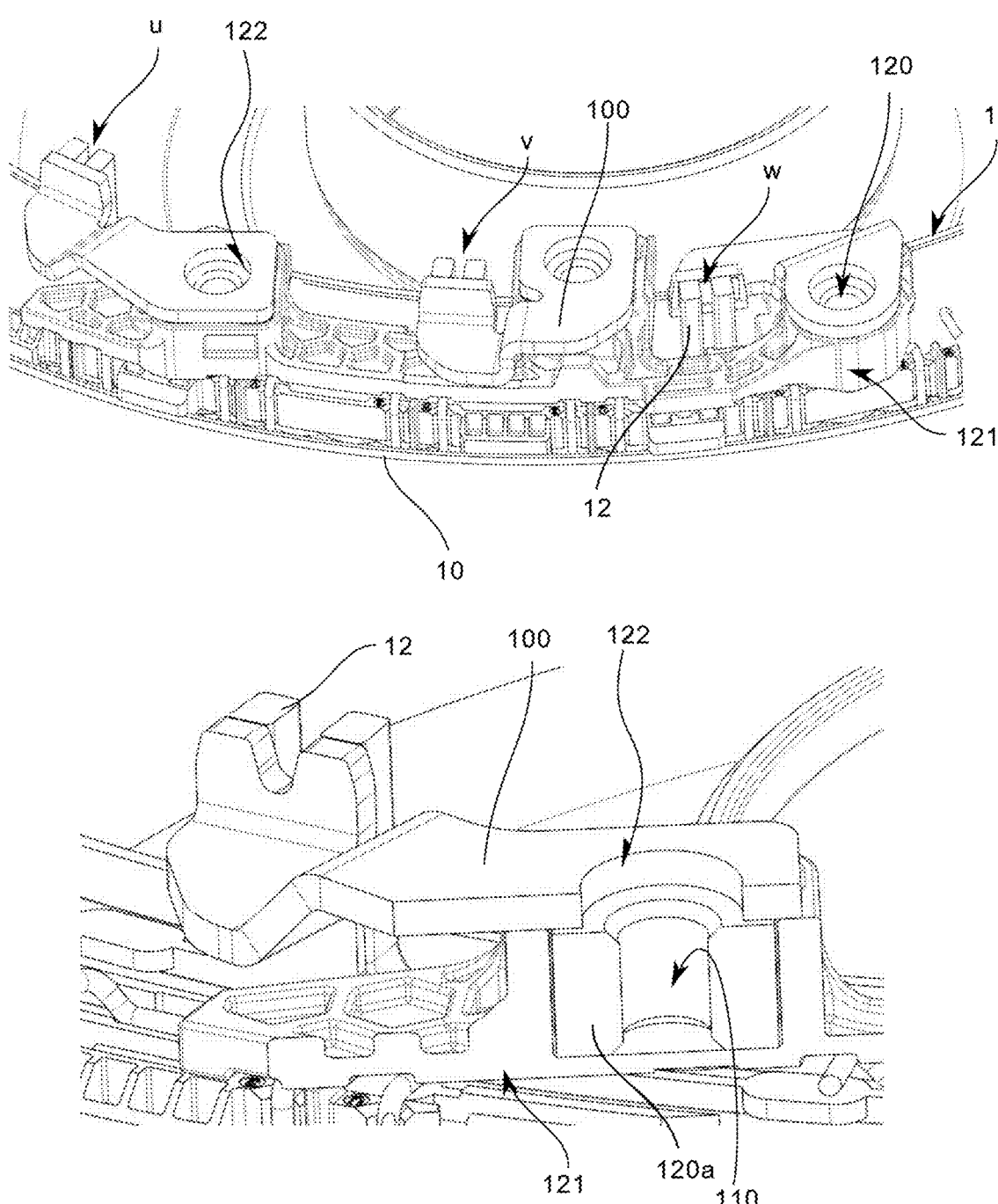
FIG. 4 shows an interconnection ring according to a second embodiment of the disclosure in a perspective view (at the top), and in an enlarged detail view in a partial sectional view (at the bottom)
Figure 5:
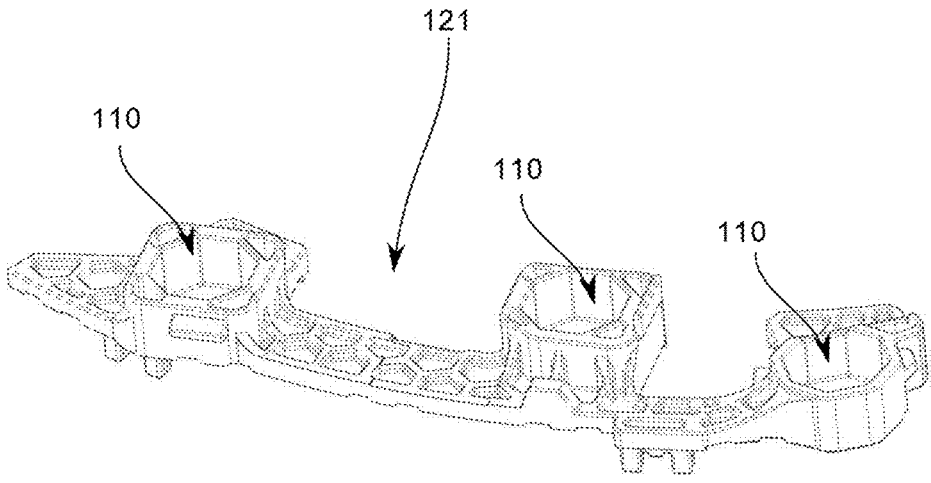
FIG. 5 shows the receptacle according to FIG. 4, with a total of three individual receiving spaces, in a perspective view.

FIG. 4 shows an interconnection ring 1 according to a second embodiment of the disclosure in a perspective view (at the top), and in an enlarged detail view in a partial sectional view (at the bottom). FIG. 5 shows the receptacle 121 according to FIG. 4, with a total of three individual receiving spaces 110, in a perspective view. The receptacle 121 has a total of three adjacently arranged receiving spaces 110 for receiving one screw nut 120$a$ in each case, wherein each receiving space 110 is assigned to a busbar 12 of a different phase u, v, w. The figure also clearly shows that the receiving space 110 of the receptacle 121 is designed to be pot-shaped and formed with a closed bottom, such that a screw element 120$b$ screwed into the screw nut 120$a$ is electrically insulated on the bottom side in the receiving space 110 of the receptacle 121.

In all of the embodiments of the disclosure shown, the screw nut 120$a$ is not rigidly pressed into the busbar 12 or welded to it, but is mounted so that it can move freely in a receiving space 110 of a separate receptacle 121 designed as a plastic part. This plastic part can be connected in a form-fitting or force-fitting or force and form-fitting manner to the busbar 12 or can be connected to a part of the housing 10 of the interconnection ring 1. Since the screw nut 120$a$ can always move within the receiving space 110 in all directions (X, Y, and Z), it is possible to compensate for various form errors, assembly tolerances, etc. The shape of the head of the screw nut 120$a$ is designed in such a way that its polygonal shape in particular allows it to be supported on the plastic body. This serves to support the torque during the tightening process. The middle figure in FIG. 3 shows an example of this.

The disclosure is not limited to the embodiments shown in the figures. The above description is therefore not to be regarded as limiting, but rather as illustrative. The following claims are to be understood as meaning that a named feature is present in at least one embodiment of the disclosure. This does not exclude the presence of further features. If the patent claims and the above description define 'first' and 'second' features, this designation serves to distinguish between two features of the same type without defining an order of precedence.

LIST OF REFERENCE SYMBOLS

1 Interconnection ring
2 Stator
10 Housing
11 Recess
12 Busbar
120 Screw connection
120$a$ Screw nut
120$b$ Screw element
121 Receptacle
121$a$ Fastening arm
121$b$ Latching means
122 Through-opening
100 Busbar connection region
110 Receiving space

The invention claimed is:

1. An interconnection ring for a stator of an electric machine, comprising:
a housing having a plurality of groove-like recesses; and
a plurality of busbars in the shape of a circular ring or circular ring segment arranged in the groove-like recesses, wherein the busbars establish an electrical contact between winding wire ends of stator windings of the stator and contact connections of a power electronics unit for controlling the electric machine, wherein, in at least one of the busbars, the electrical contact to the contact connections of the power electronics unit includes a screw connection, wherein the screw connection includes a screw nut arranged loosely in a receiving space of a receptacle underneath a through-opening of the busbar connection region, and wherein the screw nut is movable in the receiving space along an x-axis, a y-axis and a z-axis.

2. The interconnection ring according to claim 1, wherein the receptacle is formed of insulating material including a plastic or plastic composite material.

3. The interconnection ring according to claim 1, wherein the receiving space of the receptacle is pot-shaped and includes a closed bottom, whereby a screw element screwed into the screw nut is electrically insulated on a bottom side in the receiving space of the receptacle.

4. The interconnection ring according to claim 1, wherein the receiving space of the receptacle has a geometric contour corresponding to the screw nut, whereby the screw nut is secured against rotation within the receiving space.

5. The interconnection ring according to claim 1, wherein the receptacle is a separate component fastened to the busbar in a force-fitting and/or form-fitting manner.

6. The interconnection ring according to claim 5, wherein the receptacle has a fastening arm with a latch for releasably fastening the receptacle to the busbar.

7. The interconnection ring according to any claim 1, wherein the receptacle is a separate component fastened to the housing of the interconnection ring in a force-fitting and/or form-fitting manner.

8. The interconnection ring according to claim 7, wherein the receptacle has at least two adjacently arranged receiving spaces each for receiving one screw nut, wherein each receiving space is assigned to a busbar of a different phase (u, v, w).

9. A stator for an electric machine comprising:
a stator body having a plurality of stator teeth, a plurality of stator windings which are arranged in stator grooves formed between the stator teeth, and an interconnection ring arranged on an axial end face of the stator, wherein the interconnection ring includes: a housing having a plurality of groove-like recesses; and
a plurality of busbars in the shape of a circular ring or circular ring segment arranged in the groove-like recesses, wherein the busbars establish an electrical contact between winding wire ends of the plurality of stator windings and contact connections of a power electronics unit for controlling the electric machine, wherein, in at least one of the busbars, the electrical contact to the contact connections of the power electronics unit includes a screw connection, and wherein the screw connection includes a screw nut arranged loosely in a receiving space of a receptacle underneath a through-opening of the busbar connection region, and wherein the screw nut is movable in the receiving space along an x-axis, a y-axis and a z-axis.

10. An electric machine comprising a stator, the stator including:
a stator body having a plurality of stator teeth, a plurality of stator windings which are arranged in stator grooves formed between the stator teeth, and an interconnection ring arranged on an axial end face of the stator, wherein the interconnection ring includes a housing having a plurality of groove-like recesses; and a plurality of busbars in the shape of a circular ring or circular ring segment arranged in the groove-like recesses, wherein the busbars establish an electrical contact between winding wire ends of the plurality of stator windings and contact connections of a power electronics unit for controlling the electric machine, wherein, in at least one of the busbars, the electrical contact to the contact connections of the power electronics unit includes a screw connection, wherein the screw connection includes a screw nut arranged loosely in a receiving space of a receptacle underneath a through-opening of the busbar connection region, and wherein the screw nut is movable in the receiving space along an x-axis, a y-axis and a z-axis.

11. The electric machine according to claim 10, wherein the receptacle is formed of insulating material including a plastic or plastic composite material.

12. The electric machine according to claim 10, wherein the receiving space of the receptacle is pot-shaped and includes a closed bottom, whereby a screw element screwed into the screw nut is electrically insulated on a bottom side in the receiving space of the receptacle.

13. The electric machine according to claim 10, wherein the receiving space of the receptacle has a geometric contour of corresponding to the screw nut, whereby the screw nut is secured against rotation within the receiving space.

14. The electric machine according to claim 10, wherein the receptacle is a separate component fastened to the busbar in a force-fitting and/or form-fitting manner.

15. The electric machine according to claim 14, wherein the receptacle has a fastening arm with a latch for releasably fastening the receptacle to the busbar.

16. The electric machine according to claim 10, wherein the receptacle is a separate component fastened to the housing of the interconnection ring in a force-fitting and/or form-fitting manner.

17. The electric machine according to claim 16, wherein the receptacle has at least two adjacently arranged receiving spaces for receiving one screw nut in each case, wherein each receiving space is assigned to a busbar of a different phase (u, v, w).

* * * * *